C. DEUTSCH.
COOLING DEVICE FOR THE EXHAUST VALVES OF EXPLOSION ENGINES.
APPLICATION FILED DEC. 12, 1911.

1,043,076.

Patented Nov. 5, 1912.

UNITED STATES PATENT OFFICE.

CHARLES DEUTSCH, OF AMIENS, FRANCE.

COOLING DEVICE FOR THE EXHAUST-VALVES OF EXPLOSION-ENGINES.

1,043,076. Specification of Letters Patent. Patented Nov. 5, 1912.

Application filed December 12, 1911. Serial No. 665,344.

*To all whom it may concern:*

Be it known that I, CHARLES DEUTSCH, a subject of the King of Hungary, residing at Amiens, Somme, France, have invented certain new and useful Improvements in Cooling Devices for Exhaust-Valves of Explosion-Engines, of which the following is a specification.

This invention relates to improvements in the devices used for cooling the exhaust valve of high power explosion engines by means of a continuous current of water.

The object of these improvements is to avoid the choking of the water conduit by the scale deposited by the water.

The device comprises a pipe or a perforation made in the wall of the chamber situated below, or at the back of, the exhaust valve. The pipe or the perforation establishes an open communication between the said chamber and either a water tank independent of the engine, or the cooling water circulating in the engine jacket. The water, in passing through the pipe or the perforation, is converted into steam at the expense of the heat of the valve and its adjoining walls, and escapes therefrom at a great speed, thus constantly rinsing the walls of the conduit and carrying outside the scale which the water has the tendency to deposit thereon, since the steam in question becomes mixed, immediately on arrival in the valve chamber, with the hot exhaust gases escaping through the exhaust conduit.

A construction of the device according to this invention is illustrated by way of example in the accompanying drawing in which—

Figure 1:
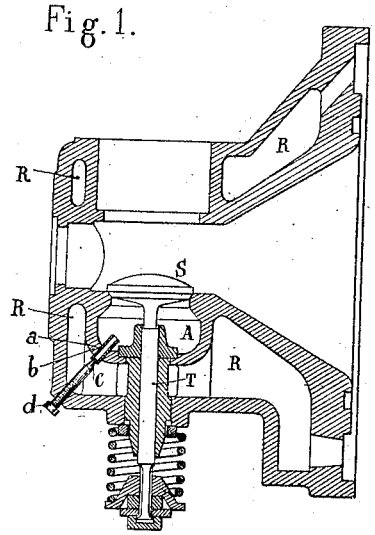
Figure 2:
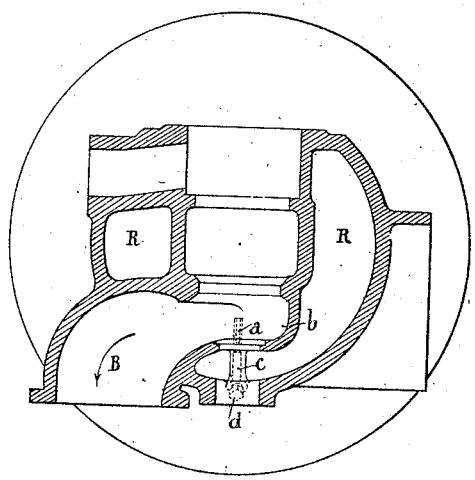

Figure 1 is a longitudinal section showing a portion of the engine adjoining the exhaust valve and provided with the device in question, while Fig. 2 is a cross-section of the said portion.

In the construction illustrated, a pipe $a$ forming a conduit for the cooling water, is fitted in an air tight manner in the wall $b$ of the chamber A of the valve, and is arranged below, or at the back of, the exhaust valve and in communication with the exhaust conduit B. The opening of the said pipe, situated in the cooling jacket B of the engine, is closed by the point $c$ of a screw-threaded rod screwed into the outer wall of the casing and terminating outside in a hexagonal head $d$ or a milled button. The manipulation of the said head $d$ or of the button enables the cross-section of the passage for the water escaping through the pipe $a$, to be regulated, and the quantity to be adjusted to the temperature of the chamber A and of the valve S.

The cooling water, in passing through the pipe $a$, is evaporated, acquires a great speed and thus carries away the scale that would have the tendency to be formed on the inner walls of the pipe $a$. The steam thus formed, becomes mixed with the hot gases escaping through the valve, and escapes and constantly forces outward the scale contained in the cooling water.

The water used for cooling the valve, instead of being taken from the water circulating in the casing R, could be obtained from a tank or a source independent of the engine. The exhaust valve S thus being constantly cooled, does not become deformed, remains perfectly air-tight, and leaking is avoided.

What I claim as my invention and desire to secure by Letters Patent is:—

In a cooling device for exhaust valves of high power explosion engines the combination of a jacketed engine, an exhaust valve chamber, a conduit arranged opposite the exhaust valve chamber, and adapted to establish communication between the said chamber and the jacket of the engine in which the cooling water circulates, a screw threaded needle-pointed rod screwed into the outer wall of the jacket, and located in the orifice of the said conduit, and a head fitted on the outer end of the said screw threaded rod whereby the position of the needle in the orifice of the pipe can be regulated for varying the quantity of the cooling water.

In testimony whereof I have signed my name to this specification in the presence of two subscribing witnesses.

CHARLES DEUTSCH.

Witnesses:
 ALBERT MAULVAULT,
 H. C. COXE.